E. S. ENSIGN.
LOCK WASHER.
APPLICATION FILED JULY 13, 1921.
1,427,946.
Patented Sept. 5, 1922.
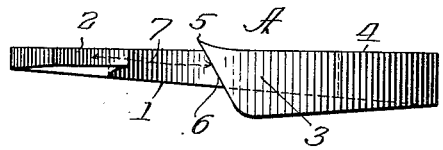
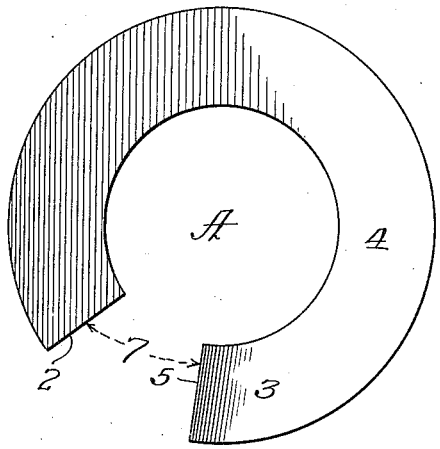
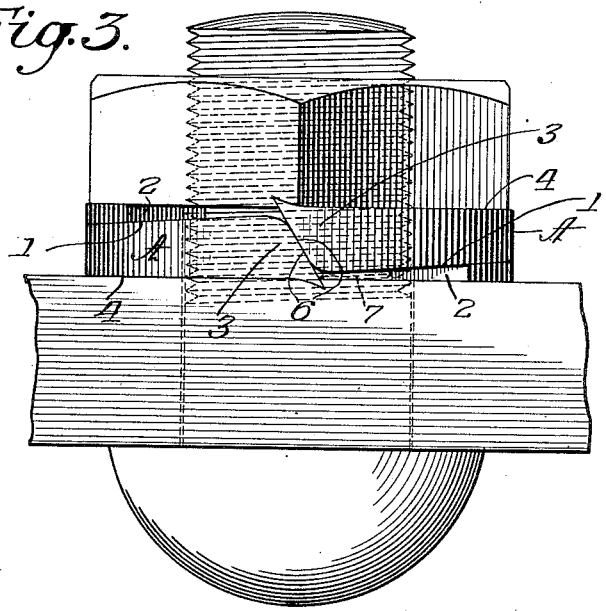
Witness:
Geo. C. Davison
Inventor
Emory S. Ensign,
By Wilkinson, Huxley, Byron & Knight,
Attys Patented Sept. 5, 1922.

1,427,946

UNITED STATES PATENT OFFICE.

EMORY S. ENSIGN, OF ROCKFORD, ILLINOIS.

LOCK WASHER.

Application filed July 13, 1921. Serial No. 484,277.

*To all whom it may concern:*

Be it known that I, EMORY S. ENSIGN, a citizen of the United States, residing at Rockford, in the county of Winnebago and State of Illinois, have invented certain new and useful Improvements in Lock Washers, of which the following is a specification.

This invention relates to lock washers of the type which, when introduced as complementary rings of a pair, between a nut and another member opposed thereto, will hold to the respective members against which they impinge and seek to rotate, relatively one to the other, when the nut tends to unscrew, and being in abutment with each other through faces (for instance faces inclined at a pitch exceeding the screw threads) that resist the backing off movement, whereby becoming an effective lock.

One object of the present invention is to provide lock washers of very simple construction, which when so used in pairs, will develop effective ratchet engagement with at least one and preferably both of the relatively rotatable members against which they respectively impinge, so that while effectively holding to their respective members in resisting backing off rotation, they permit the nut to slide over the outer washer, and the inner washer to slide over the opposing member when the nut is turned in the direction to tighten it up; and to this end one feature of the invention consists in providing one or both the washers in a pair with a portion resilient in the direction of the axis of the washers, and leaving such portion unsustained by the complementary washer and with its exposed transverse edge protruding sufficiently beyond the plane of the impinging face of the washer to permit it to dig into the face of the nut or other member by which it is received. In the preferred embodiment the washers are open rings tapered to provide an axially thin end and an axially thick end one of which is made to serve as the pawl of the ratchet like arrangement by deflecting it outward and is left resilient by not only the severance of the ring but by the fact that the opening in the complementary washer lies opposed to it and therefore leaves it unsupported.

Another object is to so construct corresponding free ends of the complementary washers that they will abut and limit relative rotation of the washers in the direction of turning on the nut, to which end the larger ends are selected for the ratchet members, also to cause their abutment to favor the outward thrust and consequent digging in of the pawl-like ends of the washers, to which end the specific embodiment preferred, has the abutting ends beveled appropriately to translate circumferential thrust of these ends into axial displacement thereof.

A further object is to so design the washers that while affording realization of the several objects previously mentioned, a pair thereof will compose a filler for the space beneath the nut, having impinging faces substantially perpendicular to the axis of revolution, so that to the circumferential extent that each washer sustains compression imposed upon its complementary washer, that is to say, for the whole circumference less the sum of the two split openings, solid support of the nut will be afforded, and the yielding pawl-like ends will not be given permanent set that crowds them below their effective positions.

An important feature of the preferred embodiment of the invention is that but a single design of washer is required, it being simply necessary to assemble two identically constructed washers in reverse position, to produce a complementary pair that will serve all of the functions herein recited.

In the accompanying drawing Figure 1 is a side view;

Figure 2 is an axial view of the preferred construction of washer; and

Figure 3 is a side view showing the assembly of two such washers in complementary relation and in a manner to realize the several objects hereinbefore recited.

Referring to the preferred embodiment in detail, A, represents the washer which has an inner face 1 extending from a thin portion 2 to a thick portion 3 upon an incline or at a pitch that is substantially greater, than (preferably twice as great as) the pitch of the threads of the nut to be guarded, and having an outer face 4 that is in a plane normal to the axis of the washer and therefore parallel to the face of the nut or other member that is to impinge against it in use. The extremity of the thick end 3 is swaged or deflected outward beyond the plane of face 4 to provide a radially extending biting edge 5, inclined circumferentially so that it will slide over the surface of a coacting member during rotation in one direction but dig into such member and prevent its rotation in the opposite direction. The circumferentially presented face 6 of the washer is preferably though not necessarily beveled for coaction with the corresponding washer as will be explained. The washer A is split to provide an opening 7 that leaves its thick end free and resilient and adapts it to act as a pawl in developing the ratchet-like action of sliding and permitting rotation in one direction and gripping and resisting relative rotation in the other direction. The opening 7 of each washer also serves an important function in its relation to the complementary washer.

In use, two washers constructed as described are assembled in a pair and in complementary relation as disclosed in Figure 3 abutting together through the beveled faces 6 of their thick ends 3, to limit their rotation in the direction of screwing on the nut, and forcing their biting edges outward; and also abutting together through their inclined faces 1 which resist rotation in the direction to back off the nut because they are of a pitch that forces the washers apart axially faster than the nut can move axially and therefore wedge tightly against the nut and arrest the turning movement. Spaces 7 of each washer lies beneath the pawl-like end of the complementary washer and affords a recess in which the resilient end may act in its ratchet action. While the incline 1 is preferred as the means to resist rotation of the outer washer, it is obvious that certain of the features would function as well with another form of control between the two washers.

I claim:

1. A nut lock comprising two washers abutting together through faces that resist backing off; one of said washers carrying, upon a portion thereof, an edge adapted to bite into a member against which it is pressed when in use, and the other washer constructed to leave said portion unsustained axially.

2. A nut lock comprising two washers abutting together through faces that resist backing off; one of said washers having an axially resilient portion carrying an edge adapted to bit into a member against which it is pressed, and the other washer being constructed to leave said resilient portion unsupported, and free to flex under the pawling.

3. A nut lock comprising two washers abutting together through faces that resist backing off; said washers being provided upon portions thereof, with oppositely presented embedding edges adapted to bite into the surfaces of members between which the washers are pressed; and each washer having a recess that lies beneath the edge bearing portion of the other washer.

4. A nut lock comprising two washers abutting together through faces that resist backing off; said washers being provided upon portions thereof, with oppositely presented embedding edges adapted to bite into the surfaces of members between which the washers are pressed; and each washer having a recess that lies beneath the edge bearing portion of the other washer; said edges being also inclined in opposite circumferential directions to cause them to drag and permit turning of their respective washers in one direction and to dig in and resist turning thereof in the other direction.

5. A nut lock for insertion between two relatively rotatable members comprising a pair of similarly tapered open ring washers adapted to be assembled in reverse positions, and in complementary relation to develop an annulus with bearing faces to receive the members between which it is inserted; the thicker ends of the washers being adapted to abut together and limit their relative rotation in one direction; the end faces through which said washers abut together being beveled to displace said ends axially of the annulus.

6. A nut lock for insertion between two relatively rotatable members comprising a pair of similarly tapered open ring washers adapted to be assembled in reverse positions, and in complementary relation to develop an annulus with bearing faces to receive the members between which it is inserted the openings in the washers providing recesses beneath the larger ends of the washers.

7. A nut lock comprising a pair of identically constructed annular washers each having spaced thin and thick ends connected by a surface inclined to a plane perpendicular to the axis of the washer, said washers being assembled with their inclined faces together, their thick ends opposed, and the space of each washer underlying the thick end of the other washer; the thick ends being deflected outward to develop gripping pawls.

8. A nut lock comprising a pair of identically constructed annular washers each having spaced thin and thick ends connected by an inner surface inclined to a plane perpendicular to the axis of the washer, and a straight outer surface in a plane perpendicular to the axis, said washers being assembled with their inclined faces together, their straight faces presented outward for impingement of members between which the washers are used, their thick ends opposed, and the space of each washer underlying the thick end of the other washer; the thick ends being deflected outward beyond said straight surfaces to develop gripping pawls.

Signed at Rockford, Ill., this 5th day of July, 1921.

EMORY S. ENSIGN.